US007434895B2

(12) United States Patent
Reynolds et al.

(10) Patent No.: US 7,434,895 B2
(45) Date of Patent: Oct. 14, 2008

(54) ELECTRONIC EQUALIZING RESERVOIR CONTROLLER WITH PNEUMATIC PENALTY OVERRIDE AND REDUCTION LIMITING

(75) Inventors: John M. Reynolds, Copenhagen, NY (US); D. Mark Petitt, LaFargeville, NY (US); Richard J. Teifke, Mexico, NY (US); Kevin B. Root, Black River, NY (US)

(73) Assignee: New York Air Brake Corporation, Watertown, NY (US)

( * ) Notice: Subject to any disclaimer, the term of this patent is extended or adjusted under 35 U.S.C. 154(b) by 278 days.

(21) Appl. No.: 11/227,096

(22) Filed: Sep. 16, 2005

(65) Prior Publication Data
US 2007/0063578 A1    Mar. 22, 2007

(51) Int. Cl.
*B60T 7/00* (2006.01)
*B60T 13/70* (2006.01)
*B60T 15/14* (2006.01)

(52) U.S. Cl. .................. 303/15; 303/7; 303/20

(58) Field of Classification Search ............. 303/7, 303/15, 3, 33, 85, 64, 70, 78, 80, 20
See application file for complete search history.

(56) References Cited

U.S. PATENT DOCUMENTS

| | | | |
|---|---|---|---|
| 2,958,561 A | 11/1960 | May | |
| 3,623,777 A | 11/1971 | Sarbach et al. | |
| 3,782,782 A | 1/1974 | Brown | |
| 4,491,372 A | 1/1985 | Walley | |
| 4,830,437 A | 5/1989 | Rumsey | |
| 4,971,399 A | 11/1990 | Balukin et al. | |
| 5,020,862 A | 6/1991 | Balukin et al. | |
| 5,172,316 A | 12/1992 | Root et al. | |
| 5,192,118 A | 3/1993 | Balukin et al. | |
| 5,222,788 A | 6/1993 | Disma et al. | |
| 5,332,297 A | 7/1994 | Cunkelman et al. | |
| 6,036,284 A | 3/2000 | Pettit et al. | |
| 6,238,010 B1 | 5/2001 | Barber et al. | |
| 6,318,811 B1 | 11/2001 | Root et al. | |
| 6,371,575 B1 | 4/2002 | Lewis et al. | |
| 6,746,087 B1 | 6/2004 | Reynolds et al. | |

*Primary Examiner*—Robert A Siconolfi
*Assistant Examiner*—Vu Q Nguyen
(74) *Attorney, Agent, or Firm*—Barnes & Thornburg LLP

(57) ABSTRACT

A control system which allows electro-pneumatic control of an equalizing reservoir with the capacity to create penalty applications in a purely pneumatic manner. A controller for the equalizing reservoir includes an electro-pneumatic source of pressure or atmosphere responsive to an electrical equalizing pressure control signal and a pilot valve selectively connecting the electro-pneumatic source or atmosphere to the equalizing reservoir in response to pressure in a pilot port of the first pilot valve. A magnetic valve is provided having a first input connected to a second source of pressure, a second input connected to atmosphere and an output connected to the pilot port of the first pilot valve. At least one penalty valve is connected to the pilot input of the first pilot valve and is responsive to a penalty signal to connect the pilot input to atmosphere. A fourth valve has a first input connected to the second input of the first pilot valve and an output connected to a third source of pressure lower than pressure in the equalizing reservoir prior to a penalty signal. The fourth valve connects its first input to its output in response to a penalty signal. A method of initializing the electro-pneumatic source of pressure or atmosphere responsive to an electrical equalizing pressure control signal.

10 Claims, 4 Drawing Sheets

ELECTRONIC EQUALIZING RESERVOIR CONTROLLER WITH PNEUMATIC PENALTY OVERRIDE AND REDUCTION LIMITING

BACKGROUND AND SUMMARY OF THE INVENTION

The present system relates generally to brake control systems and more specifically to a controller for an equalizing reservoir of a rail brake system, which includes a brake pipe controlled by a relay valve in response to pressure in the equalizing reservoir.

Prior rail brake systems have had either fully-pneumatic control of the equalizing reservoir (ER) or electro-pneumatic control of the ER. On systems which use fully-pneumatic ER control, penalty brake applications were created by exhausting a previously pressurized penalty pipe. This caused a subsequent pneumatic exhaust of the ER and brake application. On systems which use electro-pneumatic ER control, penalty brake applications are signaled to the brake system by electrical signals. The ER is then reduced to apply the brakes via electro-pneumatic control. Prior brake systems including ER controllers are illustrated in U.S. Pat. Nos. 6,036,284 and 6,318,811.

To limit the penalty reduction of the equalizing reservoir, prior systems have used reduction limiting reservoirs. Penalty application valves connect the reduction limiting reservoir to the equalization reservoir for a penalty and cuts off the control from the brake valve. The pressure in the equalizing reservoir is reduced until the two reservoir stabilize. After termination of the penalty, control is transferred back to the brake valve and the reduction limiting reservoir is emptied. Two such systems are shown in U.S. Pat. Nos. 3,623,777 and 4,491,372

A control system which allows electro-pneumatic control of an equalizing reservoir with the capacity to create penalty applications in a purely pneumatic manner is described in U.S. Pat. No. 6,746,087. The controller for the equalizing reservoir includes an electro-pneumatic source of pressure or atmosphere responsive to an electrical equalizing pressure control signal and a pilot valve selectively connecting the electro-pneumatic source or atmosphere to the equalizing reservoir in response to pressure in a pilot port of the first pilot valve. A magnetic valve is provided having a first input connected to a second source of pressure, a second input connected to atmosphere and an output connected to the pilot port of the first pilot valve. At least one penalty valve is connected to the pilot input of the first pilot valve and is responsive to a penalty signal to connect the pilot input to atmosphere. The pilot valve and the penalty valve pneumatically produce a brake application regardless of the state of the magnetic valve or its controller.

The present control system allows electro-pneumatic control of ER but with the capacity to create penalty applications in a purely pneumatic manner and reduction limiting. A controller for an ER includes an electro-pneumatic source of pressure or atmosphere responsive to an electrical equalizing pressure control signal and a first pilot valve selectively connecting the electro-pneumatic source or atmosphere at a first input or a second input to the equalizing reservoir in response to pressure in a pilot port of the first pilot valve. A magnetic valve is provided having a first input connected to a second source of pressure, a second input connected to atmosphere and an output connected to the pilot port of the first pilot valve. At least one penalty valve is connected to the pilot input of the first pilot valve and is responsive to a penalty signal to connect the pilot input to atmosphere. A fourth valve has a first input connected to the second input of the first pilot valve and an output connected to a third source of pressure lower than pressure in the equalizing reservoir prior to a penalty signal. The fourth valve connects its first input to its output in response to a penalty signal.

A method is disclosed for controlling pressure for an equalizing reservoir of a rail brake system which includes a brake pipe controlled by a relay valve in response to pressure in the equalizing reservoir and which includes an electro-pneumatic source of pressure or atmosphere having a closed loop system responsive to an electrical equalizing pressure control signal. The method includes measuring pressure in the equalizing reservoir after a penalty reduction of reservoir pressure; initially setting the electrical equalizing pressure control signal to the measured equalizing reservoir pressure after a penalty; and subsequently the activating closed loop system of the electro-pneumatic source of pressure or atmosphere to control the pressure of the equalizing reservoir to the electrical equalizing pressure control signals.

These and other aspects of the present invention will become apparent from the following detailed description of the invention, when considered in conjunction with accompanying drawings.

DETAILED DESCRIPTION OF THE PREFERRED EMBODIMENTS

Figure 1:
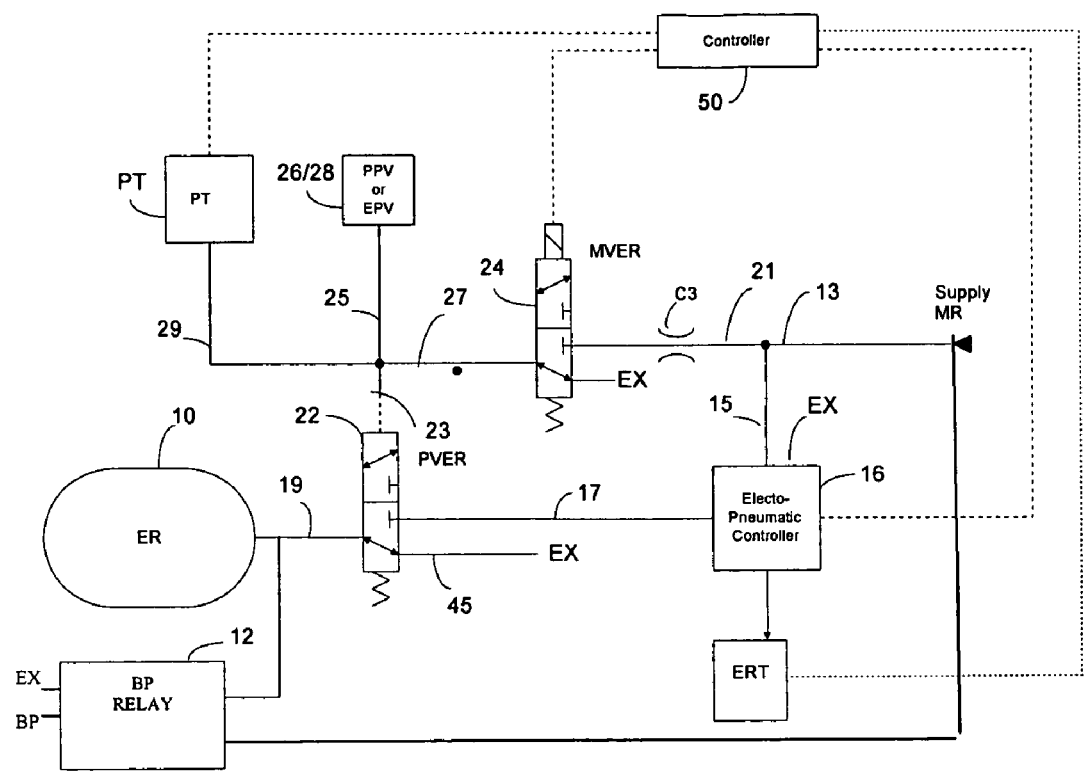
FIG. 1 is a schematic of a controller for an equalizing reservoir of the prior art.

FIG. 1 is the equalizing portion of the controller for the equalizing reservoir of U.S. Pat. No. 6,746,087, which is incorporated herein by reference. Where possible the same numbers will be used for sake of clarity. The controller for the equalizing reservoir is only part of a train brake control system, as illustrated in the previously mentioned patents. This equalizing controller may be used with systems other than those illustrated in the aforementioned patents.

As shown in the figures, an equalizing reservoir (ER) 10 is connected to and controls a brake pipe relay 12 via line 11. The brake pipe relay 12 controls a brake pipe (BP). Also, connected to the brake pipe relay 12 is exhaust (EX) and a supply or main reservoir (MR) via line 13. As is well known, the brake pipe relay 12 receives a reference signal 11 from the ER 10 and produces an appropriate pressure in the brake pipe (BP) using exhaust (EX) and pressure from the main reservoir (MR) via line 13. Reduction in the pressure in the ER 10 produces a reduction in the pressure in the brake pipe (BP), which reflects a brake application. An increase in the pressure in ER 10 creates an increase in the pressure in brake pipe (BP), which is a brake release signal. The brake pipe cut off and charging circuit have been deleted for sake of clarity. How this is accomplished is well-known, as illustrated in the above-mentioned patents.

The main reservoir (MR) is also connected via line 13 to an electro-pneumatic source of pressure or atmosphere 16, which is responsive to an electrical equalizing pressure control signal. The electro-pneumatic source 16 may include an electro-pneumatic or magnetic apply valve and an electro-pneumatic or magnetic release valve connected together at a common output 17 are shown in U.S. Pat. No. 6,746,087. Even though a pair of valves may form the electro-pneumatic source of pressure or atmosphere 16, a single valve may be used or any other electro-pneumatic control system to provide a desired equalizing reservoir pressure signal. The output 17 is connected to an equalizing reservoir transducer (ERT).

The output 17 is also provided as a first input to the equalizing reservoir pilot valve (PVER) 22. The other input is from atmosphere or exhaust (EX) on line 45. The output of the PVER 22 is provided on line 19 to the ER 10. The pilot port or pilot line 23 of valve 22 is connected to an output 27 of an electro-pneumatic or magnetic valve 24. A second pressure source at the input of 24 on line 21 is from the main reservoir (MR) and through a choke or restriction C3. The restriction C3 prevents the charging of the pilot port 23 when the penalty valve connects the pilot port 23 to exhaust (EX) or atmosphere.

The equalizing magnetic valve (MVER) 24 is shown in its deactivated condition, wherein the pilot port 23 is connected to exhaust (EX). Upon activation, the source is connected to the pilot valve 22 to move it from its shown exhaust position to its control pressure position connecting its output 19 to line 17. The control of the electro-pneumatic source 16 determines the pressure provided through the open pilot valve 22 to the ER 10. These connections and operations are well known in the prior art, as shown in the previously discussed patents.

Also, connected to pilot port 23 of the PVER 22 are pneumatic penalty valve 26 and/or electric or electro-pneumatic penalty valve 28 via penalty pilot line 25. Both of the valves 26 and 28 are responsive to a penalty input signal to connect their respective outputs to penalty pilot line 25 to exhaust (EX). This removes the pilot signal from pilot port 23 of the PVER 22 causing it to return to the shown position connecting its output 19 and the ER 10 to atmosphere or exhaust (EX). This causes the brake pipe relay 12 to reduce the brake pipe pressure causing a brake application.

The pressure value in the penalty pilot line 25 to pilot port 23 is monitored by a penalty pressure transducer (PT) via line 27. This may be used in controlling the ER 10 using the electro-pneumatic source 16 and indicates that a penalty valve has been activated connecting the penalty pilot line 25 to exhaust (EX).

A controller 50 is provided. This controller provides all of the control signals to the various electro-pneumatic or magnetic valves and receives feedback from each of the transducers. Controller 50 is illustrated as a single block and may be the controller of the brake system, which may be a single controller or may be plural distributive controllers. Portions of the controller 50 may be on a module, which includes the controller for the ER 10 as illustrated in FIG. 9 of U.S. Pat. No. 6,036,284 with other portions of the controller 50 being part of a system controller. Controller 50 is also shown controlling the electro-pneumatic penalty valves. Again, this would generally be performed by the brake system controller versus a distributive controller portion of the ER 10.

Figure 2:
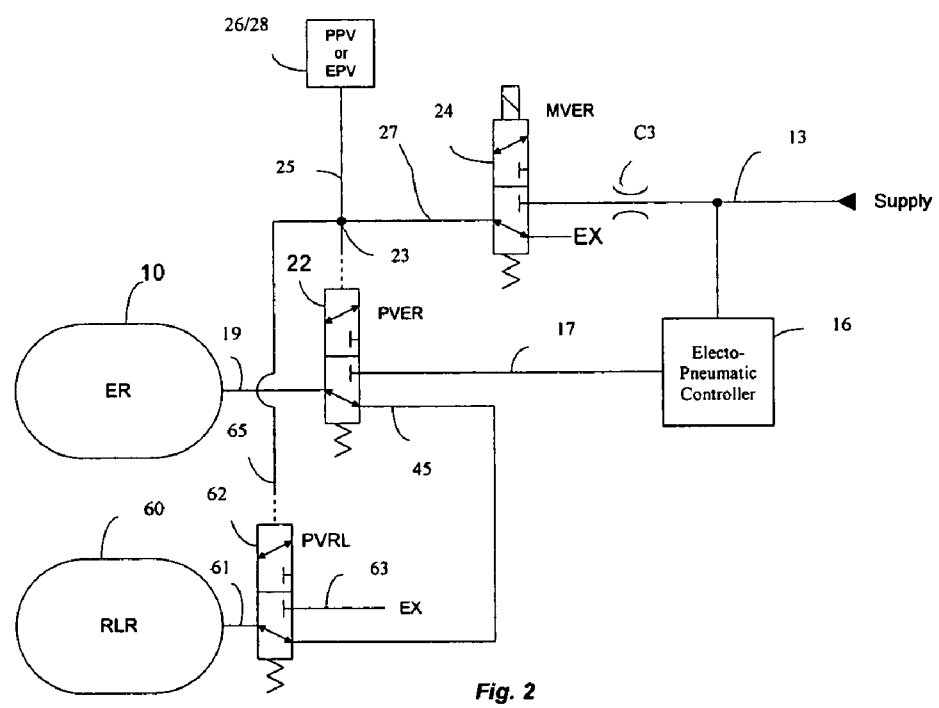
FIG. 2 is a schematic of a controller for an equalizing reservoir illustrating a first embodiment of the present invention.

As illustrated in FIG. 2 of U.S. Pat. No. 6,746,087, the penalty pilot line 25 may be connected to the input 21 of the MVER magnetic valve 24 instead of its input.

The operation of the system in FIG. 1 provides a pneumatic actuated braking in response to a penalty condition whether it is an electro-pneumatically or pneumatically sensed penalty. The controller 50 prevents a continuous exhaust of MR out of an open penalty valve. The controller can detect a penalty condition via PT and act to de-energize (close) MVER valve 24, thereby preventing any further exhaust of air. This also prevents a continuous exhaust of air when the controller (and magnetic valve 24) are in a powered off condition. This would allow an unpowered locomotive to be hauled unmanned with an open foot valve, for instance.

Figure 3:
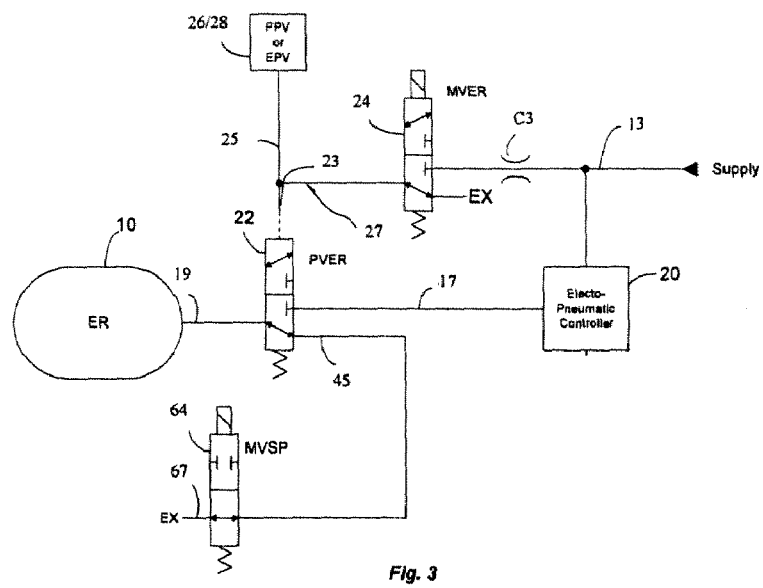
FIG. 3 is a schematic of a controller for an equalizing reservoir illustrating a second embodiment of the present invention.
Figure 4:
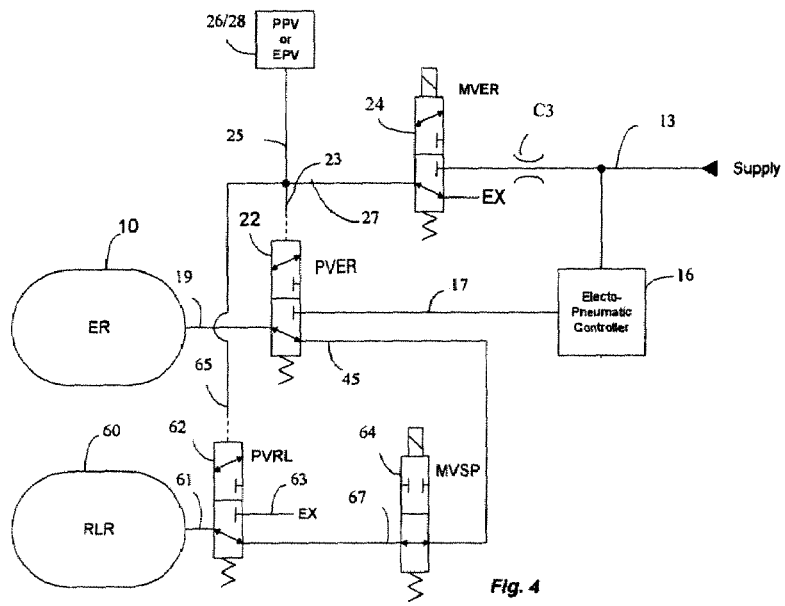
FIG. 4 is a schematic of a controller for an equalizing reservoir illustrating a third embodiment of the present invention.

FIGS. 2-4 show a modification to the equalizing reservoir system of FIG. 1 to incorporate reduction limiting. While FIG. 2 show the use of a reduction limiting reservoir and FIG. 3 shows an additional reduction limiting magnetic valve, FIG. 4 show a combination of both in series.

The line 45 of the first pilot valve (PVER) 22 is provided as a first input to a reduction limiting pilot valve (PVRL) 62. The other input is line 63 which is from atmosphere or exhaust (EX). The output of the PVRL 62 is provided on line 61 to a reduction limiting reservoir (RLR) 60. The pilot port or pilot line 65 of the PVRL 62 is connected to the pilot line 23 of the first pilot valve PVER 22.

In response to a penalty input on line 25, pilot line 65 is connected to exhaust. This removes the pilot signal of each the PVER 22 and the PVRL 62 causing each to be in the shown position. In the shown position, line 19 of the ER 10 is connected to line 45 from the PVER 22 to the input of the PVRL 62 and thus line 61 of RLR 60. The pressure within ER 10 will reduce into the volume of RLR 60. The pressure reduction within the ER 10 is proportionate to the volumetric size relationship of the ER 10 to the RLR 60. This will cause ER 10 to reduce a prescribed amount due to a penalty and thus not fully to atmosphere, thereby causing a predetermined brake application instead of a full or maximum brake application.

As described in the prior art of FIG. 1, upon activation of the equalizing magnetic valve 24 and closure of the penalty valve 26/28, source pressure is connected to pilot lines 23 and 65 via line 27. The PVER 22 shall move from its shown penalty position to its control pressure position connecting its output 19 to line 17. Upon connecting source pressure to pilot line 65, the PVRL 62 shall change from its penalty position to connect its output line 61 to line 63 and exhaust (EX), thus depleting the pressure within the RLR 60 to restore full penalty reduction capability.

The use of a magnetic valve as the reduction limiting device is illustrated in FIG. 3. The output line 45 of the pilot valve (PVER) 22 is provided as a first input to a penalty limiting magnetic valve (MVSP) 64. The other input is line 67 which is from atmosphere or exhaust (EX). The penalty valve 26/28 is responsive to a penalty input to connect line 23 to exhaust and thus remove the pilot signal to the PVER 22 causing a response to the shown position. In the shown position, line 19 of the ER 10 is connected to line 45 from the PVER 22 to the input of the MVSP 64 and thus line 67 to atmosphere or exhaust (EX). The pressure within ER 10 will reduce to cause a braking.

Upon activation of the magnetic valve (MVSP) 64 input line 45 is disconnected from line 67 to atmosphere or exhaust (EX). The pressure within ER 10 will cease to reduce and thus maintain the brake application attained as long as the pilot valve 22 remains in the position shown or penalty.

Subsequent de-activation of MVSP 64 will reconnect to line 45 to exhaust, thus further reducing ER 10 and allow a greater brake application. Subsequent activation will cease reduction and maintain the brake application attained. By the activation control of MVSP 64 during the purely override penalty operation of the system, the brake application step increase may be controlled, maintained or fully applied.

The activation and deactivation of the MVSP 64 could be single source or various other designs. A simple method could be the activation of a timing relay by a pressure sensor within the pilot line 23 that would support a single step delay of equalizing reservoir prior to full exhaust. Another method could be that of a controller, that may be intelligent, to control the steps either over time or sensor feedback control.

A combination of the reduction limiting devices or systems of FIGS. 2 and 3 are shown in FIG. 4. The magnetic valve MVSP 64 is connected to line 45 between the pilot valve PVER 22 and the pilot valve PVRL 62. This provides the current limiting features of the current limiting reservoir 60 with the stepped or staged reduction and safety features of the magnetic valve MVSP 64.

Figure 5:
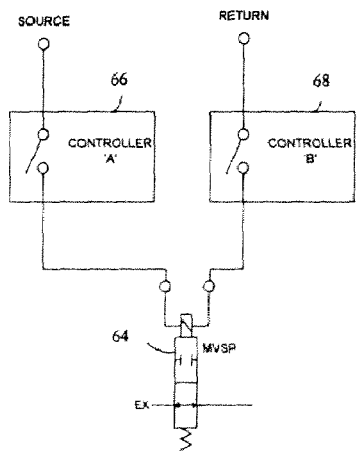
FIG. 5 is a schematic of a control of the limiting magnetic valve of FIGS. 3 and 4.

FIG. 5 show the elements of a safety design through redundant controllers for the reduction limiting magnetic valve MSVP 64.

The activation system includes two distinct, independent controllers 66 and 68. The controllers are electronic and may be of solid state or microprocessor intelligent technologies. Significant are that these controllers are separate and independent with capable knowledge to control the activation of MVSP 64. The controllers are arranged in series with the MVSP 64 in a manner that a failure of one would not prevent the other from deactivating the MVSP 64.

As shown in FIG. 5 the MVSP 64 is deactivated. The electric source for activation must first be allowed to pass through controller 66, as determined by its input requirements through closure of its switch, which may be solid state control or relay contacts, to the MVSP 64, through the activation circuit of the MVSP (coil) and allowed to pass through controller 68 to attain source to return and thus activate the MVSP 64. Controller 68 like controller 66 determines by its distinct input requirements the closure of its switch, which may be solid state control or relay contacts. Similarly, the controllers in series may activate a single relay to control MVSP 64.

High level of safety is achieved in that the MVSP 64 must be activated to prevent the application of braking. The controllers 66 and 68 are redundant, that is each must be in the activation mode to activate the MVSP 64. Failure of one in activation is overridden by the other. There would be several arrangements that would enhance the safety of the circuitry as the series addition of independent locomotive safety devices, such as cab signal, positive train control and vigilant systems. All to prevent the activation of the circuitry and thus allow braking to apply to the full potential.

Recovery of the pressure in the pilot port 23 results in the pilot valve PVER 22 disconnecting the equalizing reservoir ER 10 from atmosphere and connecting it to the electro-pneumatic source of pressure 16. When pressure in the ER is actively in the stage of reducing and when a penalty override terminates, an abruptly reconnect to the electro-pneumatic source 16 may cause an undesirable effect. The prior art options is to 1) stop the reduction from occurring any further or 2) delay the recovery of the pilot port pressure till full application of braking. Option 1 is not desirable as full application may not have been attained and removes the selection of adding more braking through the control of the electro-pneumatic source 16. Option 2 is not desired as the time for assurance of full braking capability would be a restriction to the overall operating system or control of the locomotive.

The present design allows for the connection of ER 10 to the electro-pneumatic source 16 with no degradation to braking ability, expectation of the operator or inhibit to further application braking. The present design is applicable to any of the equalizing reservoir control system with an electro-pneumatic control including but limited to those illustrated in FIGS. 1-4.

In the prior art, the controller 50 has a responsibility in the recovery of a penalty application. As described above, recovery of a penalty requires the restoration of supply pressure to pilot line 23. Supply source pressure is not available unless the controller 50 has activated the MVER 24 to connect source line 13 to pilot line 23. The PPV or EPV 26/28 must be activated to disconnect the pilot line 23 from atmosphere or exhaust. Only then may the pilot line 23 be allowed to develop pressure and activate the PVER 22. The activated PVER 22 disconnects exhaust or reduction limiting line 45 and connects the ER 10 line 19 to line 17 and thus the electro-pneumatic controller 16.

Figure 6:
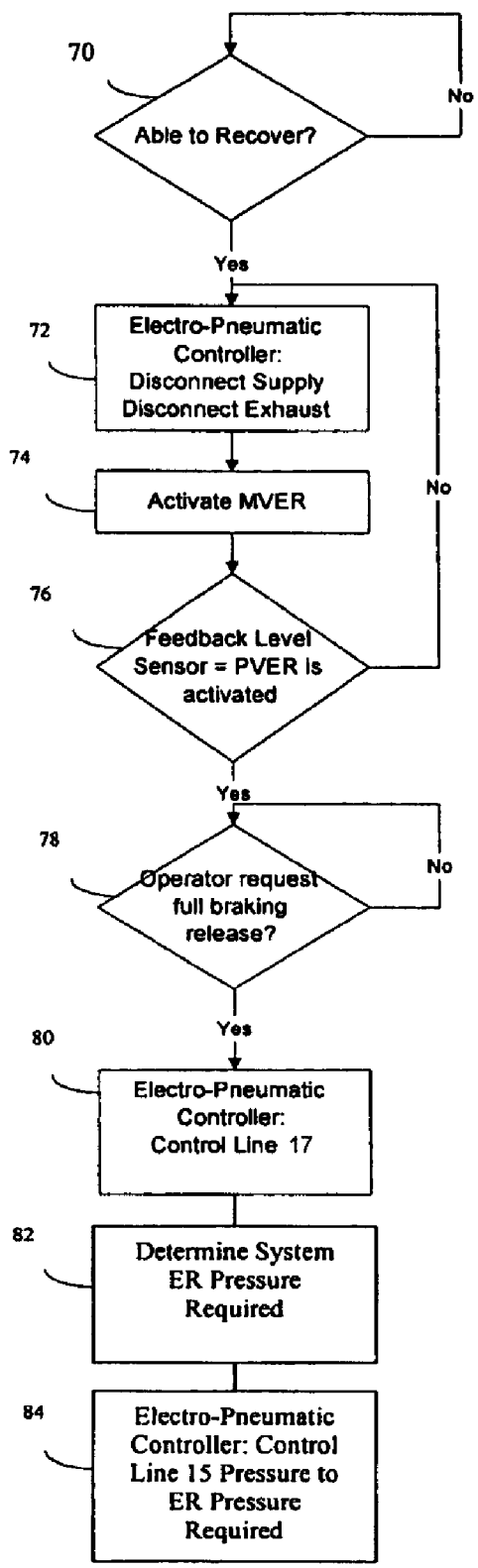
FIG. 6 is a flow chart of the control of the equalizing reservoir after a penalty of the prior art.

As illustrated in FIG. 6, a determination is made at step 70 whether recovery is possible. If so the, controller 50 would delay activation of the MVER 24 through its logic to assure that the ER 10 has reduced sufficiently to assure a reliable application of braking. Prior to activation of MVER 24 at step 74, the controller 50 disconnects each the supply and exhaust of the electro-pneumatic controller 16 from line 17 at step 72. Thus on the activation of the PVER 22 due to the development of pressure within line 25, the ER 10 would neither increase or decrease pressure, thereby maintaining the level of braking achieved.

The controller 50 would monitor the feedback level sensor PT and determine the activation state of the PVER 22 at step 76. Once the activation was determined and on command of the operator to fully release braking at step 78, then the controller 50 would allow the electro-pneumatic controller 20 to increase, maintain and control pressure within line 17 and thus ER 10 at steps 82 and 84.

Figure 7:
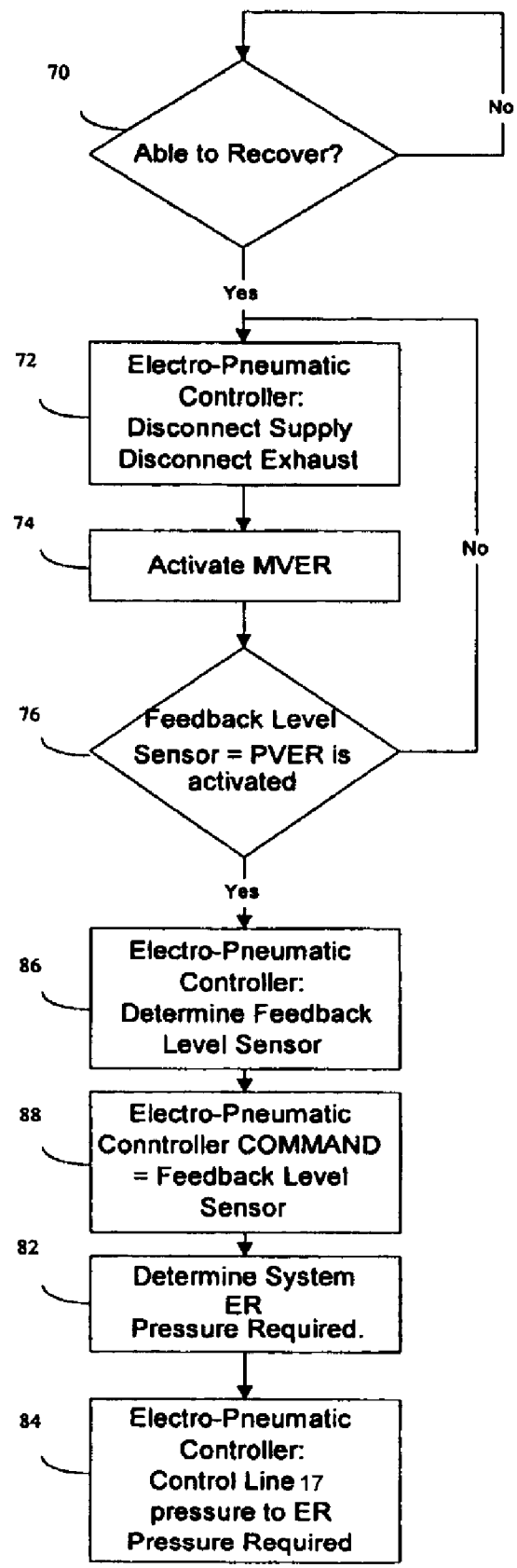
FIG. 7 is a flow chart of the control of the equalizing reservoir after a penalty according to the present disclosure.

In the present system as illustrated in FIG. 7, the controller 50 still has the responsibility in the recovery of a penalty application. As described in the prior art, the controller 50 activates the MVER 24 at step 74, disconnects each the supply and exhaust of the electro-pneumatic controller 16 at step 72, and monitors the feedback level sensor PT to determine the activation state of the PVER 22 at step 76. Next the system allows the electro-pneumatic controller 16 to maintain, decrease or control pressure within line 17 and thus ER 10 without the requirement of the operator to fully release braking as in step 78.

The controller 50 monitors the feedback level sensor PT to determine the activation state of the PVER 22 at step 76. The controller 50 determines whether the ER 10 is in connection via line 19 and PVER 22 to line 17 and thus to the electro-pneumatic controller 16. If so, the electro-pneumatic controller 16 has an integrated feedback level sensor that the controller 50 determines the pressure on line 17 and thus the pressure within the ER 10 from the transfer ERT of the electro-pneumatic controller 16 at step 86. The controller 50 then sends a target ER signal to the electro-pneumatic controller 16 equal to the feedback level sensor value at step 88. However electro-pneumatic control 16 does not allow connections to source or exhaust to be made. This preconditions the closed loop control of the electro-pneumatic controller 16. The controller 50 determines the desired braking request from the locomotive at step 82, which includes the operator and other logical requirements as the continuance of the penalty brake due to recovery needs. The electro-pneumatic controller 16 closed loop control is actuated at step 84 to selectively connect to source and/or exhaust to line 17 to establishing full electro pneumatic control of braking.

This method provides a seamless transition from the override of ER control function back to operator control, fully under the requirements and rules of the standards well known in the industry. The safety of the override features are not compromised but enhanced as the disconnection of source and exhaust at the electro-pneumatic controller prevent the possibility of the undesired effects of pressure leakage. The operator is not confused by a difference in operation and is less likely to over react that could result in undesirable heavy braking effects.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A controller for an equalizing reservoir of a rail brake system which includes a brake pipe controlled by a relay valve in response to pressure in the equalizing reservoir, the controller comprising:
    an electro-pneumatic source of pressure or atmosphere responsive to an electrical equalizing pressure control signal;
    a first pilot valve selectively connecting the electro-pneumatic source of pressure or atmosphere at a first input or connecting a second input to the equalizing reservoir in response to pressure in a pilot port of the first pilot valve;
    a first magnetic valve having a first input connected to a second source of pressure, a second input connected to atmosphere and an output connected to the pilot port of the first pilot valve;
    a penalty valve connected to the pilot port of the first pilot valve and responsive to a penalty signal to connect the pilot port to atmosphere;
    a second pilot valve having a pilot port connected to the pilot port of the first pilot valve, having a first input, and having an output connected to a third source of pressure lower than pressure in the equalizing reservoir prior to a penalty signal, the second pilot valve connecting the second pilot valve's first input to the second pilot valve's output in response to a penalty signal; and
    a second magnetic valve selectively connecting the second input of the first pilot valve to the first input of the second pilot valve.

2. The controller according to claim 1, wherein the third source of pressure is a second reservoir.

3. The controller according to claim 2, wherein the second pilot valve has a second input connected to atmosphere and the second pilot valve connects the second pilot valve's second input to the second pilot valve's output in the absence of the penalty signal.

4. The controller according to claim 1, wherein the penalty valve and the second pilot valve are responsive to at least one of an electric penalty signal and a pneumatic penalty signal.

5. The controller according to claim 1, wherein the electro-pneumatic source of pressure or atmosphere includes a pressure transducer to measure the pressure in the equalizing reservoir and a closed loop system to control the pressure of the equalizing reservoir to the electrical equalizing pressure control signal.

6. The controller according to claim 5, wherein the electrical equalizing pressure control signal is initially set to the measured equalizing reservoir pressure after a penalty before activating the closed loop system.

7. The controller according to claim 5, wherein the pressure transducer is connected to the first input of the first pilot valve.

8. The controller according to claim 1, including a pressure transducer connected to the pilot port of the first pilot valve and used for one of control of the first magnetic valve and an indication of an open to atmosphere penalty valve.

9. A method of controlling pressure for an equalizing reservoir of a rail brake system which includes a brake pipe controlled by a relay valve in response to pressure in the equalizing reservoir and which includes an electro-pneumatic source of pressure or atmosphere having a closed loop system responsive to an electrical equalizing pressure control signal, the method comprising:
    measuring pressure in the equalizing reservoir after a penalty reduction of reservoir pressure;
    initially setting the electrical equalizing pressure control signal to the measured equalizing reservoir pressure after a penalty; and
    subsequently activating the closed loop system of the electro-pneumatic source of pressure or atmosphere to control the pressure of the equalizing reservoir to the electrical equalizing pressure control signal without requiring a command to fully release braking.

10. A controller for an equalizing reservoir of a rail brake system which includes a brake pipe controlled by a relay valve in response to pressure in the equalizing reservoir, the controller comprising:
    an electro-pneumatic source of pressure or atmosphere responsive to an electrical equalizing pressure control signal;
    a first pilot valve selectively connecting the electro-pneumatic source of pressure or atmosphere at a first input or connecting a second input to the equalizing reservoir in response to pressure in a pilot port of the first pilot valve;
    a first magnetic valve having a first input connected to a second source of pressure, a second input connected to atmosphere and an output connected to the pilot port of the first pilot valve;
    a penalty valve connected to the pilot port of the first pilot valve and responsive to a penalty signal to connect the pilot port to atmosphere;
    a fourth valve having a first input connected to the second input of the first pilot valve and an output connected to a third source of pressure lower than pressure in the equalizing reservoir prior to a penalty signal, the fourth valve connecting the fourth valve's first input to the fourth valve's output in response to a penalty signal;
    wherein the electro-pneumatic source of pressure or atmosphere includes a pressure transducer to measure the pressure in the equalizing reservoir and a closed loop system to control the pressure of the equalizing reservoir to the electrical equalizing pressure control signal; and
    wherein the electrical equalizing pressure control signal is initially set to the measured equalizing reservoir pressure after a penalty before activating the closed loop system without requiring a command to fully release braking.

* * * * *

UNITED STATES PATENT AND TRADEMARK OFFICE
CERTIFICATE OF CORRECTION

| | | |
|---|---|---|
| PATENT NO. | : 7,434,895 B2 | Page 1 of 1 |
| APPLICATION NO. | : 11/227096 | |
| DATED | : October 14, 2008 | |
| INVENTOR(S) | : John M. Reynolds et al. | |

It is certified that error appears in the above-identified patent and that said Letters Patent is hereby corrected as shown below:

Fig. 6: Combine box 80 and 82, delete the words "Control Line 15". In Box 84, change "15" to "17".

Fig. 7: In Box 88, change "Conntroller" to "Controller". In Box 82, change "Determine System ER Pressure Required." to "Electro-Pneumatic Controller:" In Box 84, change "15" to "17".

Col. 3, line 5, change "are" to "as".

Col. 3, line 2, change "27" to "29".

Col. 4, line 2, change "input" to "output".

Signed and Sealed this

Tenth Day of November, 2009

David J. Kappos
*Director of the United States Patent and Trademark Office*